(12) United States Patent
Wang et al.

(10) Patent No.: US 11,634,911 B2
(45) Date of Patent: Apr. 25, 2023

(54) FLOOR BOARD

(71) Applicants: NANTONG CIMC ECO NEW MATERIAL DEVELOPMENT CO., LTD., Nantong (CN); CHINA INTERNATIONAL MARINE CONTAINERS (GROUP) LTD., Shenzhen (CN)

(72) Inventors: Fuyou Wang, Nantong (CN); Xiao Fang, Nantong (CN)

(73) Assignees: NANTONG CIMC ECO NEW MATERIAL DEVELOPMENT CO., LTD, Jiangsu (CN); CHINA INTERNATIONAL MARINE CONTAINERS (GROUP) LTD., Guangdon (CN)

( * ) Notice: Subject to any disclaimer, the term of this patent is extended or adjusted under 35 U.S.C. 154(b) by 0 days.

(21) Appl. No.: 17/000,697

(22) Filed: Aug. 24, 2020

(65) Prior Publication Data

US 2020/0392742 A1    Dec. 17, 2020

Related U.S. Application Data (63) Continuation of application No. PCT/CN2019/074202, filed on Jan. 31, 2019.

(30) Foreign Application Priority Data

Feb. 9, 2018 (CN) .......................... 201810136638.6

(51) Int. Cl.
E04F 15/10 (2006.01)
B29C 44/32 (2006.01)
(Continued)

(52) U.S. Cl.
CPC .......... *E04F 15/105* (2013.01); *B29C 44/321* (2016.11); *B29C 44/322* (2013.01);
(Continued)

(58) Field of Classification Search
CPC .......... E04F 15/105; E04F 2015/02072; E04F 15/02044; E04F 15/107; B29C 44/322;
(Continued)

(56) References Cited

U.S. PATENT DOCUMENTS 6,037,049 A * 3/2000 Tingley .................. B29C 70/52
                                                          144/350
6,092,472 A * 7/2000 Thoman ............... B61D 17/045
                                                          105/396
(Continued)

FOREIGN PATENT DOCUMENTS

CN        2873486 Y     2/2007
CN      104441702 A     3/2015
(Continued)

OTHER PUBLICATIONS

International Search Report and translation in International Application No. PCT/CN2019/074202.
(Continued)

*Primary Examiner* — Brent W Herring
(74) *Attorney, Agent, or Firm* — Mei & Mark LLP (57) ABSTRACT

A floor board, and a method and apparatus for manufacturing same. The floor board (100) comprises a polyurethane-foam board (110). The polyurethane-foam board (110) is made of a polyurethane foam material foamed from a polyurethane foam raw material. The polyurethane-foam board (110) is provided with a plurality of linear members (120) passing though the polyurethane-foam board in a predetermined direction. The plurality of linear members
(Continued)

(120) are arranged at intervals. The polyurethane-foam board (110) is foaming-molded by continuous drawing.

9 Claims, 7 Drawing Sheets

(51) Int. Cl.
  *B29C 70/52* (2006.01)
  *B62D 25/20* (2006.01)
  *E04F 15/02* (2006.01)
  *B29K 75/00* (2006.01)
  *B29L 31/00* (2006.01)
  *B62D 29/04* (2006.01)
  *B62D 33/02* (2006.01)
  *B65D 90/02* (2019.01)
  *B29C 44/46* (2006.01)

(52) U.S. Cl.
  CPC .......... *B29C 70/52* (2013.01); *B62D 25/2054* (2013.01); *E04F 15/02044* (2013.01); *B29C 44/468* (2013.01); *B29K 2075/00* (2013.01); *B29L 2031/732* (2013.01); *B62D 25/20* (2013.01); *B62D 29/04* (2013.01); *B62D 33/02* (2013.01); *B65D 90/023* (2013.01)

(58) Field of Classification Search
  CPC ..... B29C 70/52; B29C 44/321; B29C 44/468; B29C 70/44; B29C 70/521; B29C 70/682; B29C 70/86; B29C 70/086; B29C 70/088; B29K 2075/00; B29L 2031/732; B29L 2007/002; B62D 25/20; B62D 29/04; B62D 33/02; B62D 25/2054; B65D 90/023; B29D 99/0021; B32B 27/06; B32B 27/40; B32B 27/065; B32B 5/18; B32B 2266/0278
  USPC ......... 52/589.1, 591.4, 309.4, 309.11, 309.9, 52/309.14
  See application file for complete search history.

(56) References Cited

U.S. PATENT DOCUMENTS

| | | | | |
|---|---|---|---|---|
| 6,138,580 | A * | 10/2000 | Thoman | B29C 70/865 105/396 |
| 9,643,377 | B2 * | 5/2017 | Song | E04F 15/105 |
| 2007/0113958 | A1 * | 5/2007 | Brown | B29C 70/521 156/166 |
| 2007/0113983 | A1 * | 5/2007 | Brown | C08G 18/7657 156/441 |
| 2007/0117921 | A1 * | 5/2007 | Brown | B29C 70/523 524/425 |
| 2007/0125042 | A1 * | 6/2007 | Hughes | B32B 27/32 52/782.1 |
| 2007/0163194 | A1 * | 7/2007 | Stone | B32B 7/12 156/289 |
| 2009/0092821 | A1 * | 4/2009 | Dharan | B29C 44/328 264/45.3 |
| 2009/0165411 | A1 * | 7/2009 | Schiffmann | B29D 99/0014 52/309.4 |
| 2009/0311932 | A1 * | 12/2009 | Hughes | B32B 1/00 264/261 |
| 2011/0305865 | A1 * | 12/2011 | Cocconi | B60R 13/0815 427/244 |
| 2013/0115412 | A1 * | 5/2013 | Padmanabhan | B29C 70/521 428/113 |
| 2015/0375471 | A1 * | 12/2015 | Song | E04F 13/0885 156/304.3 |
| 2015/0376946 | A1 * | 12/2015 | Kurzer | B29C 70/521 156/215 |
| 2016/0032595 | A1 * | 2/2016 | Janesky | B32B 5/18 52/302.1 |
| 2019/0270263 | A1 * | 9/2019 | Mukherji | B29D 99/0003 |
| 2020/0215770 | A1 * | 7/2020 | Gu | C08J 5/043 |

FOREIGN PATENT DOCUMENTS

| | | | |
|---|---|---|---|
| CN | 104742460 A | | 7/2015 |
| CN | 208100900 U | | 11/2018 |
| JP | 2003049530 A | * | 2/2003 |
| JP | 2003056168 A | * | 2/2003 |
| WO | WO-9942676 A1 * | 8/1999 | ........... B29C 70/086 |
| WO | WO-2014112629 A1 * | 7/2014 | ........... B32B 13/02 |
| WO | WO-2015157846 A1 * | 10/2015 | ........... B29C 70/088 |
| WO | WO-2017216809 A2 * | 12/2017 | ........... B29C 70/081 |
| WO | WO-2018228972 A1 * | 12/2018 | ........... B29C 70/52 |

OTHER PUBLICATIONS

Written Opinion of the International Searching Authority and translation in International Application No. PCT/CN2019/074202.

* cited by examiner

FLOOR BOARD

CROSS-REFERENCE

The present disclosure is a continuation of International Application no. PCT/CN2019/074202, filed on Jan. 31, 2019, and titled "FLOOR BOARD, AND METHOD AND APPARATUS FOR MANUFACTURING SAME," the entire subject matter and contents thereof are incorporated herein by reference.

TECHNICAL FIELD

The present disclosure relates to the technical field of floor boards, and more particularly relates to a floor board, and a method and apparatus for manufacturing same.

BACKGROUND

Floor boards, as the carrying member in the field of transportation and communication, are not only required to have an excellent mechanical property, but are also required to have a good anti-corrosion property, a good endurance quality, a light weight and a good aesthetic property, to satisfy their usage requirements with respect to the environmental working conditions and the life cycles. Currently, industrial floor boards mainly include wood floor boards, steel floor boards and composite-material floor boards.

Wood floor boards, especially wood plywood, mainly employ hardwoods of tens of perennials from tropical rainforest, such as hard-broad-leaf Keruing and Apitong. In the recent years, the over-exploitation of tropical rainforest has brought a huge pressure on the environment. Furthermore, because wood floor boards are not resistant to the corrosion by salts, steam, water and fog, moth damage easily happens, which results in defects such as an unstable mechanical property and a short service life.

Traditional steel floor boards easily deform under frequent loads, and have defects such as a poor corrosion resistance, with the result that steel floor boards are difficult to apply at a large scale. Currently, steel floor boards are mainly used for specific bulk containers, vehicles and platforms.

Composite-material floor boards, as a novel type of floor boards having a high strength and a corrosion resistance, are being gradually accepted by the users. The current composite-material floor boards are mainly thermoset products that are manufactured by pultrusion. Because the thermoset composite-material floor boards have low tensile strengths, their surfaces cannot be nailed for fixing cargo, which limits their applications in traditional dry containers.

Therefore, there is a need for a floor board, and a method and apparatus for manufacturing same, to at least partially solve the problems in the prior art.

SUMMARY

A series of concepts in the simplified form are introduced into the section of SUMMARY, which will be described in further details in the section of DETAILED DESCRIPTION. The section of SUMMARY of the present disclosure is not intended to attempt to limit the critical features and essential technical features of the claimed technical solutions, and is not intended to attempt to define the protection scopes of the claimed technical solutions.

In order to at least partially solve the above problems, according to an aspect of the present disclosure, there is provided a floor board, wherein the floor board comprises a polyurethane-foam board, and the polyurethane-foam board is made from a polyurethane foamed material that is made by foaming a polyurethane foaming raw material;

the polyurethane-foam board is provided with a plurality of thread-like members that extend throughout the polyurethane-foam board in a predetermined direction, and the plurality of thread-like members are arranged with spacings therebetween; and the polyurethane-foam board is foaming-formed by continuous pulling.

According to this solution, the polyurethane-foam board is the base-body member of the floor board, and enables the floor board to have excellent nail holding property and anti-corrosion property and a low finished-product density. The thread-like members are the reinforcing bodies of the floor board, to reinforce the structure of the floor board, and enable the floor board to have a good mechanical property.

The floor board according to the present disclosure can replace traditional floor boards, which effectively solves the problems of environmental pollution, quality stability and anticorrosion caused by traditional floor boards. Furthermore, the floor board can satisfy the requirement that the floor board is to be nailed during usage to fix the cargo.

Preferably, the floor board further comprises at least one Fiber Reinforced Polymer/Plastic board (hereafter, "FRP board"), located on at least one of an upper side and a lower side of the polyurethane-foam board.

Preferably, the thickness of the FRP board is 0.5-5.0 mm and/or the density of the FRP board is 1600-2100 kg/m$^3$.

Preferably, the plurality of thread-like members are arranged with equal spacings therebetween.

Preferably, the thread-like members extend in a length direction of the floor board, and the plurality of thread-like members are arranged with equal spacings therebetween in a width direction of the floor board.

Preferably, the polyurethane foaming raw material comprises a polyurethane resin and a foaming agent.

Preferably, the thread-like members are made from at least one of glass fiber, carbon fiber, aramid fiber and basalt fiber.

Preferably, a thickness of the polyurethane-foam board is 20-100 mm and/or a density of the polyurethane-foam board is 500-1100 kg/m$^3$.

Preferably, a thickness of the polyurethane-foam board is 25-35 mm and/or the density of the polyurethane-foam board is 700-1100 kg/m$^3$.

Preferably, two ends of the floor board are provided with rabbets for splicing.

According to another aspect of the present disclosure, there is provided a method for manufacturing the floor board of any one of the aspects of the above technical solutions, wherein the method comprises:

a preforming step of extending the plurality of thread-like members in the predetermined direction, and arranging neighboring thread-like members with the spacings therebetween;

a coating step of coating the polyurethane foaming raw material to the thread-like members;

a foaming-forming step in which the polyurethane foaming raw material has a chemical reaction, to form the polyurethane foamed material, and the polyurethane foamed material is solidified and formed into the polyurethane-foam board; and a pulling step of moving the thread-like members and the polyurethane-foam board by continuous pulling in the predetermined direction.

According to this solution, the floor board comprising the polyurethane-foam board can be formed. Furthermore, each of the plurality of thread-like members can continuously extend in the predetermined direction and be distributed in the polyurethane-foam board. The as-manufactured floor board can have excellent nail holding property, anti-corrosion property and mechanical property.

The method according to the present disclosure has simple operation steps, can guarantee the continuous production of the floor board, and improves the efficiency of production and processing.

Preferably, prior to the foaming-forming step, a cross-sectional area of an area of the plurality of thread-like members is substantially the same as a cross-sectional area of the polyurethane-foam board.

Preferably, in the foaming-forming step, the polyurethane foaming raw material is heated, to perform the chemical reaction at a predetermined temperature.

Preferably, in the preforming step, the thread-like members are arranged with the spacings therebetween by using a directing element that is provided with through holes.

Preferably, in the coating step, the coating of the thread-like members is performed by spray coating or dip coating.

Preferably, the thread-like members pass through the polyurethane foaming raw material while being pulled or the thread-like members are spray-coated by the polyurethane foaming raw material while being pulled.

Preferably, the method further comprises, subsequent to the foaming-forming step, a compositing step of fixing by glue adhesion the polyurethane-foam board and the FRP board.

Preferably, in the compositing step, a glue adhesive used in the fixing by glue adhesion is solidified under a vacuum-negative-pressure condition.

According to still another aspect of the present disclosure, there is provided an apparatus for manufacturing the floor board of any one of the aspects of the above technical solutions, wherein the apparatus comprises.

a preforming device, configured to arrange the plurality of thread-like members to cause the plurality of thread-like members to extend in the predetermined direction and with the spacings therebetween;

a coating device, located downstream of the preforming device, configured to coat the polyurethane foaming raw material to the thread-like members;

a forming device, located downstream of the coating device, configured so that the polyurethane foaming raw material has the chemical reaction, to form the polyurethane foamed material, and the polyurethane foamed material is solidified and formed into the polyurethane-foam board; and a pulling device, located downstream of the forming device, configured to pull the polyurethane-foam board out of the forming device.

According to this solution, the floor board comprising the polyurethane-foam board can be formed. Furthermore, each of the plurality of thread-like members can continuously extend in the predetermined direction and be distributed in the polyurethane-foam board. The as-manufactured floor board can have excellent nail holding property, anti-corrosion property and mechanical property.

Preferably, the apparatus further comprises a tensioning device, wherein the tensioning device is provided upstream of the coating device, and is configured to maintain a predetermined tension of the plurality of thread-like members.

Preferably, the forming device comprises a heating component for heating the polyurethane foaming raw material.

Preferably, the coating device comprises a dip-coating tank for containing the polyurethane foaming raw material, and the dip-coating tank is provided with through holes to enable the thread-like members to pass through the dip-coating tank while being pulled.

Preferably, the coating device comprises a nozzle for spraying the polyurethane foaming raw material and a receiving tank located under the nozzle, and the receiving tank is provided with through holes to enable the thread-like members to pass through the receiving tank while being pulled.

Preferably, the preforming device comprises a directing element, the forming device comprises a forming mold, and the directing element is configured so that a cross-sectional shape of an area of the plurality of thread-like members is substantially the same as a cross-sectional shape of the forming mold.

BRIEF DESCRIPTION OF THE DRAWINGS

The following drawings of the present disclosure serve as part of the present disclosure and are used for the understanding of the present disclosure. The drawings show the embodiments of the present disclosure and the description thereon, which are used to interpret the device and the principle of the present disclosure. In the drawings.

DETAILED DESCRIPTION

In the following description, a large quantity of particular details are given so as to provide a more thorough understanding of the present disclosure. However, it is apparent to a person skilled in the art that the present disclosure can be implemented without one or more of those details. In some other examples, in order to avoid confusion with the present disclosure, some technical features that are well known in the art are not described.

In order to thoroughly understand the present disclosure, detailed structures will be proposed in the following description, to explain the present disclosure. The implementing of the present disclosure is not limited to the particular details that are well known by a person skilled in the art. The preferable embodiments of the present disclosure are in detail described as follows, but besides those detailed descriptions, the present disclosure can also have other embodiments, and should not be interpreted to be limited to the embodiments disclosed herein.

It can be understood that the terms used herein are merely for the purpose of describing the particular embodiments and not for limiting the present disclosure. The terms "a", "an" and "said/the" in the singular forms are also intended to encompass the plural forms, unless clearly indicated otherwise in the context. When the terms "comprise" and/or "include" are used in the specification, they identify the existence of the identified feature, integration, step, operation, element and/or component, but do not exclude the existence or addition of one or more other features, integrations, steps, operations, elements, components and/or a combination thereof. The terms used in the present disclosure "upper", "lower", "front", "rear", "left", "right" and similar expressions are only for the purpose of description, and not for limiting.

The ordinal numerals used in the present disclosure such as "first" and "second" are only for identification, and do not have any other meanings, for example a particular order. Furthermore, for example, the term "first component" itself does not imply the existence of a "second component", and the term "second component" itself does not imply the existence of a "first component".

The particular embodiments of the present disclosure will be explained in further detail below by referring to the drawings. The drawings show the representative embodiments of the present disclosure, and do not limit the present disclosure.

The First Preferable Embodiment

Figure 1:
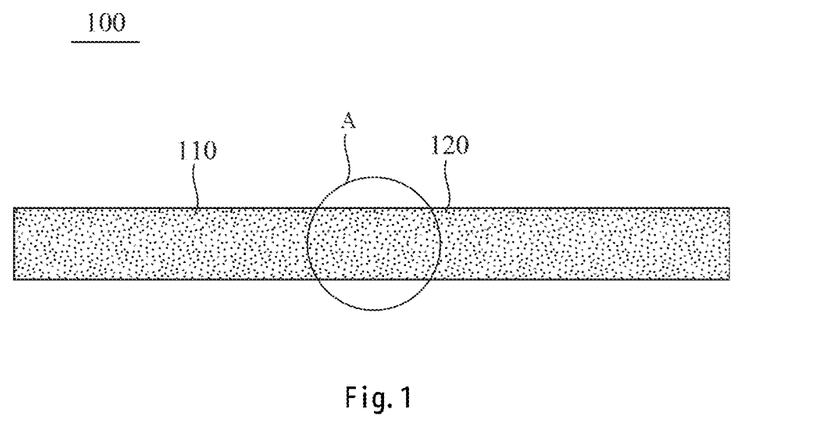
FIG. 1 is a structural schematic diagram of the floor board according to the first preferable embodiment of the present disclosure.
Figure 2:
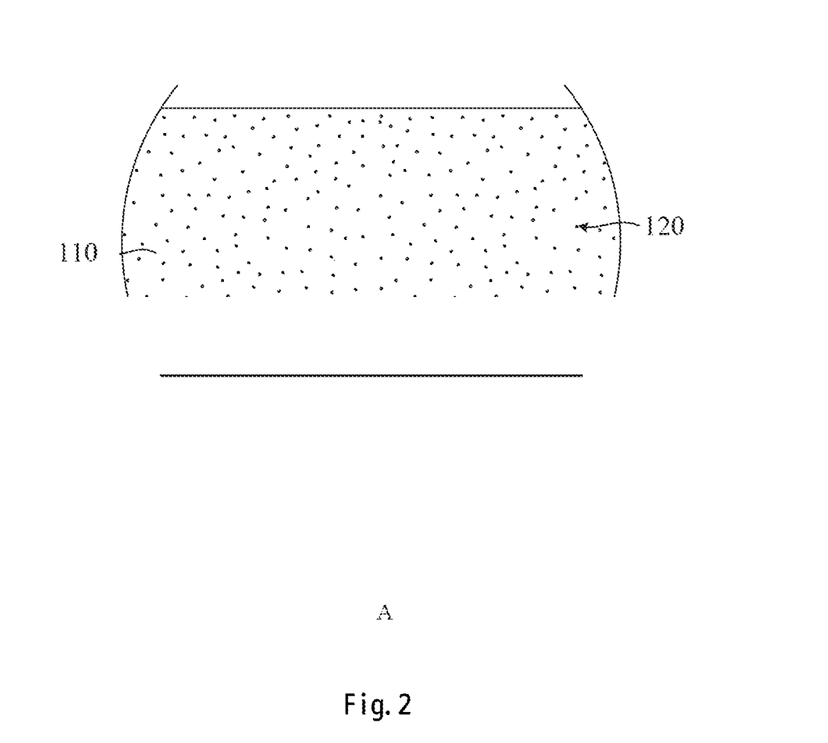
FIG. 2 is a partially enlarged schematic diagram of the part A shown in FIG. 1.

The present disclosure provides a floor board 100, and the floor board 100 can be applied to various fields such as containers, vehicles, outdoor platforms, energy sources, chemical industry and architectural ornament. It can be understood that the floor board 100 according to the present disclosure has a small thickness and large length and width; for example, the thickness is generally 20 mm-110 mm. As shown in FIGS. 1 and 2, the floor board 100 comprises a polyurethane-foam board 110. The polyurethane-foam board 110 is provided with a plurality of thread-like members 120.

The polyurethane-foam board 110 is the base-body member of the floor board 100, and enables the floor board 100 to have excellent nail holding property and anti-corrosion property and a low finished-product density. Furthermore, the polyurethane-foam board 110 is made from a polyurethane foamed material that is made by foaming a polyurethane foaming raw material. Because the polyurethane foamed material serves as the base-body material in the present embodiment, the floor board 100 of a predetermined shape can be formed, and the floor board 100 can be installed by fixing by using a fastener such as a bolt. Accordingly, the floor board 100 has a wide applicability, and can be applied to conventional freight containers.

The plurality of thread-like members 120 are the reinforcing bodies of the floor board 100. Each of the thread-like members 120 continuously extends and is provided in the polyurethane-foam board 110, which enables the floor board 100 to have a good mechanical property, and improves the nail holding property and the anti-corrosion property of the floor board 100. The plurality of thread-like members 120 extend throughout the polyurethane-foam board 110 in a predetermined direction, and are substantially parallel to each other in the polyurethane-foam board 110. It can be seen from FIG. 2 that the plurality of thread-like members 120 according to the present embodiment are arranged to be spaced apart from each other, and particularly, are arranged with equal spacings therebetween. In other words, all of the distances between individually two neighboring thread-like members 120 are substantially the same. Optionally, the plurality of thread-like members 120 are arranged in an array. Because the thread-like members 120 are substantially evenly distributed in the polyurethane-foam board 110, the density of the polyurethane-foam board 110 can be uniform (The densities of different portions of the polyurethane-foam board 110 are substantially the same), which guarantees that the floor board 100 has a high structural stability, is not easily deformable, and has a high load carrying capacity.

The predetermined direction may be the length direction or the width direction of the floor board 100. Preferably, the predetermined direction is the length direction of the floor board 100, and the thread-like members 120 extend in the length direction of the floor board 100. It can be understood that, in the present embodiment, the floor board 100 comprises merely the polyurethane-foam board 110. Accordingly, particularly, the thread-like members 120 extend in the length direction of the polyurethane-foam board 110, and the plurality of thread-like members 120 are arranged with equal spacings therebetween in the width direction of the floor board 100. Therefore, the polyurethane-foam board can be foaming-formed by continuous pulling conveniently. In other words, the floor board 100 may be manufactured by the combination of the process of board continuous formation and the process of foaming-formation, thereby improving the efficiency of production and processing.

Preferably, the thickness of the polyurethane-foam board 110 is 20-100 mm, and the density of the polyurethane-foam board 110 is 500-1100 kg/m$^3$. In other words, in the present preferable embodiment, the thickness of the floor board 100 is preferably 20-100 mm, and the density of the floor board 100 is preferably 500-1100 kg/m$^3$. The width of the floor board 100 is preferably 200-500 mm. According to different usage working conditions and carried loads, products of the floor board 100 having the corresponding densities can be provided, and their densities may be regulated in the range of 500-1100 kg/m$^3$. The length dimension of the floor board 100 may be set according to the practical demands.

More preferably, the thickness of the polyurethane-foam board 110 is 25-35 mm, and the density of the polyurethane-foam board 110 is 700-1100 kg/m$^3$. Accordingly, the floor board 100 can meet the requirements of tests of the highest grade on container floor boards and vehicle floor boards. Particularly, the floor board 100 can meet the technical requirements of 7.26-ton car test and 10.886-ton 3000-times fatigue test.

Further, the polyurethane foaming raw material comprises a polyurethane resin and a foaming agent. The polyurethane foaming raw material is preferably made by mixing the polyurethane resin and the foaming agent at a certain ratio. The liquid polyurethane foaming raw material is foamed after a chemical reaction to form a solid polyurethane foamed material. If needed and/or desired, the polyurethane foaming raw material may further comprise an auxiliary material, such as a coloring agent and an anti-aging agent, which can adjust the color of the floor board 100, improve the ageing resistance, and so on.

The thread-like members 120 are the continuous-fiber reinforcing bodies of the floor board 100. The thread-like members 120 are yarns made from at least one of glass fiber, carbon fiber, aramid fiber and basalt fiber. Accordingly, it can be understood that the thread-like members 120 are continuous-fiber reinforcing bodies that are made from the above fiber reinforcing materials. Preferably, the thread-like members 120 are yarns that are made from continuous glass-fiber filaments. If needed and/or desired, the fiber reinforcing material may also be other natural fiber materials, but is not limited to natural fiber materials. In conclusion, the floor board according to the present disclosure may be referred to as a continuous-fiber-reinforced foamed-polyurethane composite-material-type floor board.

Figure 3:
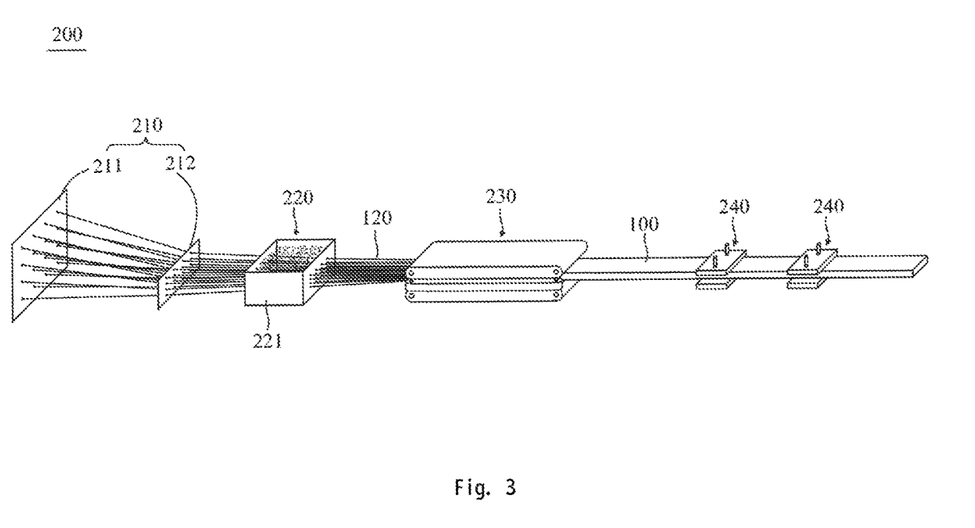
FIG. 3 is a schematic diagram of the apparatus for manufacturing the floor board shown in FIG. 1.

According to another aspect of the present preferable embodiment, there is provided an apparatus 200 for manufacturing the above floor board 100, and the apparatus 200 is configured so that the above floor board 100 can be manufactured by using the process of board continuous formation. Particularly, as shown in FIG. 3, the apparatus 200 comprises a preforming device 210, a coating device 220, a forming device 230 and a pulling device 240. The preforming device 210 is configured to arrange a plurality of thread-like members 120 in a predetermined direction to cause the plurality of thread-like members 120 to extend in the predetermined direction and with spacings therebetween. Further, the thread-like members 120, especially the extension direction and the spacings therebetween thereof are regularly arranged by using the preforming device 210. The coating device 220 is configured to coat the polyurethane foaming raw material to the thread-like members 120. The forming device 230 is configured so that the polyurethane foaming raw material has the chemical reaction, to form the polyurethane foamed material, and the polyurethane foamed material is solidified and formed into the polyurethane-foam board 110. The pulling device 240 is configured to pull the polyurethane-foam board 110 out of the forming device 230.

Particularly, a required quantity of the thread-like members 120 are arranged by using the preforming device 210 at predetermined density, so that the plurality of thread-like members 120 can be arranged into a predetermined shape of the floor board 100.

Preferably, the preforming device 210 comprises a directing element. The thread-like members 120 are pulled to pass through the directing element in the predetermined direction, to form the substantially equal spacings between the neighboring ones. The directing element may be a directing plate that has through holes that are substantially evenly distributed. The through holes of the directing element correspond to the thread-like members 120 one by one. In the present embodiment, the neighboring through holes in the directing element may be arranged with equal spacings therebetween.

The drawings show an embodiment of the directing element. The directing element comprises a pre-directing element 211 and a preforming element 212 that are located in front of the coating device 220. The distances between the neighboring through holes of the pre-directing element 211 are larger than the distances between the neighboring through holes of the preforming element 212. The thread-like members 120 sequentially pass through the pre-directing element 211 and the preforming element 212, to enable the thread-like members 120 to convert from a dispersive arrangement into a parallel arrangement with substantially equal spacings therebetween. Furthermore, the through holes of the preforming element 212 are arranged to form the predetermined shape of the floor board 100, and accordingly, the thread-like members 120, after passing through the preforming element 212, can form the predetermined shape of the floor board 100.

Another embodiment of the directing element is as follows. The directing element further comprises an additional forming element (not shown) for further regulating the cross-sectional shape of the area of the thread-like members 120. The additional forming element may be located between the preforming element 212 and the coating device 220, so that the thread-like members 120 can sequentially pass through the pre-directing element 211, the preforming element 212 and the additional forming element, to realize the continuous arrangement. Optionally, the distances between the neighboring through holes of the additional forming element are smaller than the distances between the neighboring through holes of the preforming element 212. Therefore, the cross-sectional area of the area of the plurality of thread-like members 120 gradually decreases, and gradually tends to be a preset cross-sectional area of the polyurethane-foam board 110.

Alternatively, the additional forming element may be located between the coating device 220 and the forming device 230, so that the cross-sectional shape of the area of the thread-like members 120 can be regulated again before the thread-like members 120 enter the forming device 230. It should be noted that the distances between the neighboring through holes of the additional forming element may be larger or smaller than the distances between the neighboring through holes of the preforming element 212. The distances between the neighboring through holes of the additional forming element may be selected according to the actual shape of the floor board 100. Accordingly, the present embodiment can, without replacing the coating device 220, realize different predetermined shapes of the floor board 100 conveniently, by replacing the additional forming element or by regulating the distances between the neighboring through holes of the additional forming element, which improves the applicability of the apparatus.

Further, the coating device 220 is located downstream of the preforming device 210. The coating device 220 may be a spray-coating device, a dip-coating device or other suitable coating devices. In an embodiment of the coating device 220 shown in FIG. 3, the coating device 220 may be a dip-coating device. Therefore, the polyurethane foaming raw material may be adhered to and coated to the surfaces of the thread-like members 120 by dip coating (i.e., the thread-like members 120 are immersed). Accordingly, the surfaces of the thread-like members 120 can be completely and uniformly adhered with the polyurethane foaming raw material, which can improve the effect of the subsequent foaming formation.

The embodiments in the drawings show part of the dip-coating device. Further, the coating device 220 comprises a dip-coating tank 221 for containing the polyurethane foaming raw material. The thread-like members 120 pass through the dip-coating tank 221 in the predetermined direction while being pulled. Therefore, the polyurethane foaming raw material can be uniformly coated to the thread-like members 120, and moved together with the thread-like members 120 to the forming device 230.

Particularly, the two sidewalls of the dip-coating tank 221 that the thread-like members 120 pass through are provided with through holes that correspond to the thread-like members one by one. The distances between the neighboring through holes of each of the sidewalls are substantially the same as the distances between the neighboring through holes of the preforming element 212. The thread-like members 120 pass through the dip-coating tank 221 substantially parallelly to each other. If needed and/or desired, the distances between the neighboring through holes of each of the sidewalls may be different from the distances between the neighboring through holes of the preforming element 212.

Therefore, the cross-sectional shape of the area of the plurality of thread-like members 120 can be further regulated.

The coating device 220 further comprises a collecting tank (not shown) and a reflux pump (not shown). Because the polyurethane foaming raw material may flow out from the sidewalls, the collecting tank is provided under the dip-coating tank 221, and the polyurethane foaming raw material in the collecting tank is delivered to the dip-coating tank 221 by using the reflux pump, which can avoid the waste of the polyurethane foaming raw material.

Figure 4:
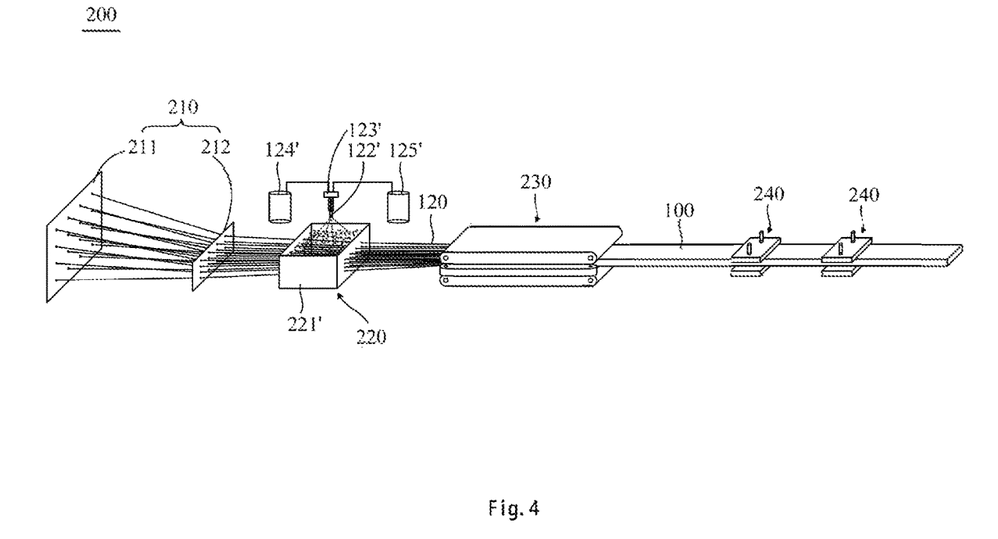
FIG. 4 is a schematic diagram of another apparatus for manufacturing the floor board shown in FIG. 1.

In another embodiment of the coating device 220 shown in FIG. 4, the coating device 220 may be a spray-coating device. Therefore, the polyurethane foaming raw material may be coated to the surfaces of the thread-like members 120 by spray coating. The spray-coating device may comprise a receiving tank 221' and a nozzle 122' located above the receiving tank 221'. A small part of the polyurethane foaming raw material that is not adhered to the thread-like members 120 may be collected at the bottom of the receiving tank 221', to prevent environmental pollution. The receiving tank 221' may have a structure substantially the same as that of the dip-coating tank 221 according to the above embodiment, which is not described for the sake of brevity. The nozzle is connected via a pipeline to a supplying device for supplying the polyurethane foaming raw material. The pipeline is provided with a material pumping system 123'. The supplying device comprises a component-A vessel 124' for storing a component A and a component-B vessel 125' for storing a component B. Both of the component-A vessel 124' and the component-B vessel 125' are connected to the material pumping system 123' via the pipeline. It can be understood that the component A is a polyether-polyol composition, and is also referred to as a white material, and the component B is an isocyanic-ester composition, and is also referred to as a black material. When the thread-like members 120 are passing through the receiving tank 221' in the predetermined direction while being pulled, the nozzle 122' sprays the polyurethane foaming raw material to the thread-like members 120 located at the receiving tank 221'. The spraying mode cannot only save the raw material but also can improve the effect of the coating.

Further, the forming device 230 is located downstream of the coating device 220, and comprises a forming mold. The cross-sectional shape of the forming mold can enable the formation of the predetermined shape of the floor board 100. As stated above, in the present embodiment, the directing element is configured so that the cross-sectional shape of the area of the plurality of thread-like members 120 is substantially the same as the cross-sectional shape of the forming mold, which can enable the formed thread-like members 120 in the polyurethane-foam board 110 to be arranged with equal spacings therebetween. Particularly, the area that is formed by the through holes of the directing element that are most adjacent to the forming mold may be substantially the same as the cross-section area of the forming mold, which results in that the cross-sectional shape of the area of the plurality of thread-like members 120 is substantially the same as the cross-sectional shape of the forming mold. For example, in an embodiment of the above-described directing element, the area that is formed by the through holes of the pre-directing element 211 may be substantially the same as the cross-section area of the forming mold. In another embodiment of the above-described directing element, in the case that the additional forming element is located between the coating device 220 and the forming device 230, the area that is formed by the through holes of the additional forming element may be substantially the same as the cross-section area of the forming mold.

In the forming mold, the polyurethane foaming raw material can undergo a series of chemical reactions to be foamed and solidified into the polyurethane foamed material, wherein the thread-like members 120 are arranged in the polyurethane foamed material substantially uniformly. Then, the polyurethane foamed material, in the process of its formation, is squeezed by the forming mold to be formed into the floor board 100. The forming mold is configured so that the manufactured floor board 100 is a flat board. The forming mold is preferably a continuously rolling mold.

The forming device 230 further comprises a heating component (not shown) for heating the polyurethane foaming raw material, which can provide a heating temperature preferable for the reactions of the polyurethane foaming raw material. Preferably, the heating temperature is 100-180° C. At such a heating temperature, the reaction rates of the polyurethane foaming raw material are high, which increases the production efficiency of the floor board 100. The heating component may be an electric heating element provided inside the forming mold.

The forming device 230 further comprises a pressurizing component (not shown) for applying a pressure to the forming mold. The pressurizing component can enable the cross-sectional shape of the forming mold to be maintained always the same as the predetermined cross-sectional shape of the floor board 100.

Further, the apparatus 200 further comprises a cutting apparatus for cutting the floor board 100. The pulling device 240 is located downstream of the forming device 230. The pulling device 240 pulls the floor board 100 to move, to realize the continuous production of the floor board 100. The pulling device 240 is preferably a reciprocating tractor.

The cutting apparatus is located downstream of the pulling device 240, to cut the manufactured floor board 100 into a required size according to the demand. When the predetermined direction is the length direction, the floor board 100 having a predetermined length is obtained by using the cutting apparatus.

Figure 5:
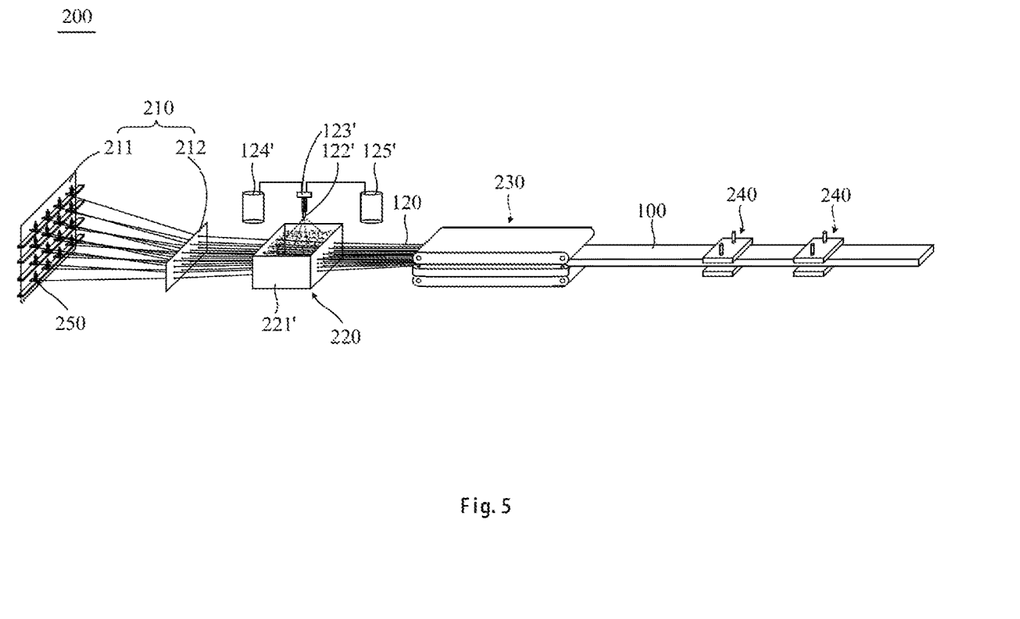
FIG. 5 is a schematic diagram of still another apparatus for manufacturing the floor board shown in FIG. 1.

Further, in another embodiment of the present embodiment, as shown in FIG. 5, the apparatus 200 further comprises a tensioning device 250 provided upstream of the coating device 220. The tensioning device 250 can enable the plurality of thread-like members 120 to maintain a predetermined tension during the travelling. By means of the tensioning device 250, each of the plurality of thread-like members 120 travels in the respective travelling paths defined by the directing element, and does not deviate from the travelling path due to any factor (such as the injection pressure of the polyurethane foaming raw material). Especially, in the forming mold, the plurality of thread-like members 120 will not displace and deviate from the travelling paths where they are located during the foaming process of the polyurethane foaming raw material, and therefore, local aggregation (for example, aggregation at the outer edge of the polyurethane-foam board 110) of the thread-like members 120 can be prevented, thereby forming a polyurethane-foam board 110 having an uniform density.

Figure 6:
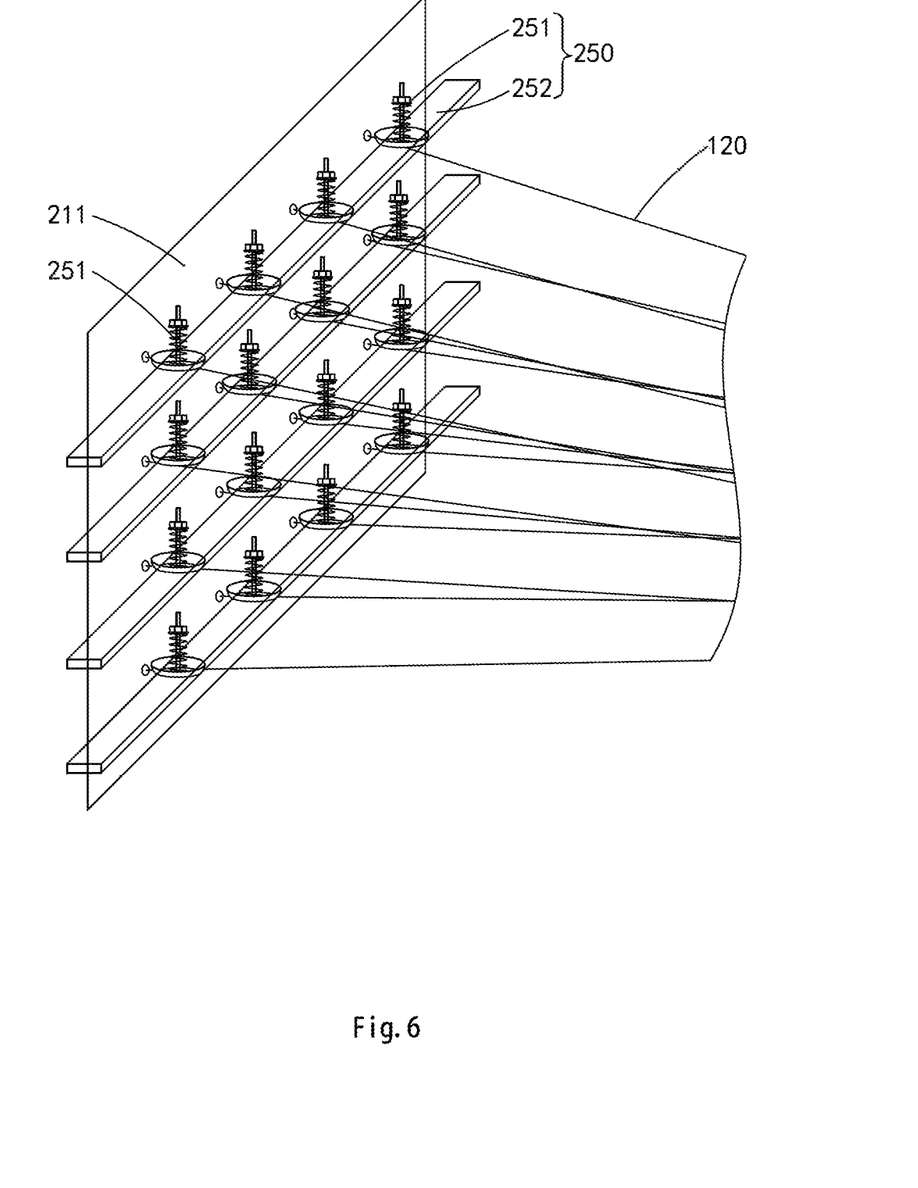
FIG. 6 is an enlarged schematic diagram of the tensioning device shown in FIG. 5.

Particularly, in the embodiment shown in the drawings, the tensioning device 250 is provided on the directing element, and the tensioning device 250 comprises a plurality of tensioning components 251. The tensioning components 251 correspond to the thread-like members 120 one by one. Optionally, the tensioning device 250 is provided on the pre-directing element 211. The tensioning components 251 may be a tensioner, such as a tension clamp. If needed and/or desired, the tensioning device 250 may be provided on another directing element such as the preforming element 212. As shown in FIG. 6, the directing element is provided with installation base plates 252 for installing the tensioning components 251, and the installation base plates 252 are arranged in rows. Optionally, each row of the thread-like members 120 may be installed on one corresponding installation base plates 252. The tensioning components 251 are configured so that they can regulate the magnitude of the tension of the thread-like members 120.

According to still another aspect of the present preferable embodiment, there is provided a method for manufacturing the above floor board 100. The method employs a process of board continuous formation to manufacture the floor board 100, and comprises:

A preforming step of extending the plurality of thread-like members 120 in the predetermined direction, and arranging the thread-like members 120 with spacings therebetween;

a coating step of coating the polyurethane foaming raw material to the thread-like members 120;

a foaming-forming step in which the polyurethane foaming raw material has a chemical reaction, to form the polyurethane foamed material, and the polyurethane foamed material is solidified and formed into the polyurethane-foam board 110; and a pulling step of moving the thread-like members 120 and the polyurethane-foam board 110 by continuous pulling in the predetermined direction.

By using the above steps, the floor board 100 comprising the polyurethane-foam board 110 can be formed. Furthermore, the plurality of thread-like members 120 can be distributed in the polyurethane-foam board 110 evenly in the predetermined direction. The as-manufactured floor board 100 can have excellent nail holding property and anti-corrosion property.

The thread-like members 120 may be pulled in the predetermined direction to move, and is always in the tensioned state. In the process of the movement of the thread-like members 120, the preforming step, the coating step and the foaming-forming step are sequentially performed. The finally formed polyurethane-foam board 110 is also pulled in the predetermined direction to move. Accordingly, the continuous production of the floor board can be realized, which improves the efficiency of production and processing. It can be understand that, because one end of the thread-like members 120 is connected to the floor board 100, the movement of the floor board 100 can drive the movement of the thread-like members 120.

Preferably, the process of the foaming formation according to the present embodiment is a high-temperature high-pressure process. During the foaming-forming step, the polyurethane foaming raw material is heated, to perform the chemical reaction at a predetermined temperature to perform foaming. Furthermore, in order to obtain a floor board 100 having a high strength, during the process of the foaming, the polyurethane foamed material is required to be pressurized, to form the floor board 100 having the predetermined shape in the squeezing process.

In the forming mold, the polyurethane foaming raw material can undergo a series of chemical reactions to be foamed and solidified into the polyurethane foamed material, wherein the thread-like members 120 are arranged in the polyurethane foamed material uniformly. Then, the polyurethane foamed material, in the process of its formation, is squeezed by the forming mold to be formed into the floor board 100.

Preferably, in the preforming step, the thread-like members 120 are arranged with the spacings therebetween by using a directing element that is provided with through holes. That can enable the cross-sectional area of the area of the plurality of thread-like members 120, prior to the foaming-forming step, to be substantially the same as the cross-sectional area of the polyurethane-foam board 110, which guarantees that the thread-like members 120 are distributed substantially evenly in the polyurethane-foam board 110.

Preferably, in the coating step, the coating mode of the thread-like members 120 may be spray coating, dip coating and other suitable modes. In the embodiment shown in the drawings, the thread-like members 120 are coated with the polyurethane foaming raw material by dip coating. Particularly, the plurality of thread-like members 120 pass through the polyurethane foaming raw material (contained in a tank) while being pulled. Alternatively, the polyurethane foaming raw material may also be coated by spray coating. Particularly, the plurality of thread-like members 120 are spray-coated with the polyurethane foaming raw material while being pulled. Both of the two modes can enable the polyurethane foaming raw material to be uniformly coated to the surfaces of the thread-like members 120, and moved together with the thread-like members 120.

Preferably, the method further comprises a cutting step of cutting the manufactured floor board 100 into a required size according to the demand. The direction of the cutting is the direction substantially perpendicular to the predetermined direction, to form floor boards of different lengths.

The method for manufacturing the floor board 100 according to the present preferable embodiment may be implemented by using the above apparatus 200 for manufacturing the floor board 100, and, for the sake of brevity, the particular process of forming the floor board 100 may refer to some of the contents of the above apparatus 200.

TABLE 1

| tested product | concentrated load/KN | bending strength/Mpa | elasticity modulus/Mpa |
| --- | --- | --- | --- |
| oak floor board | 71.2 | 86.2 | 11042 |
| birch floor board | 54.6 | 80 | 10170 |
| plywood | 72.6 | 86 | 11826 |
| floor board 100 | 98.6 | 218 | 13263 |

It can be seen from the test result in the above table that, as compared with the conventional wood floor boards and plywood used as a floor board, the floor board 100 according to the present embodiment has a superior load carrying performance, does not easily crack or deform, can satisfy the requirements on the structural strength of the floor boards of containers, container-type vehicles, freight containers and so on, and has wide application fields.

The Second Preferable Embodiment

Figure 7:
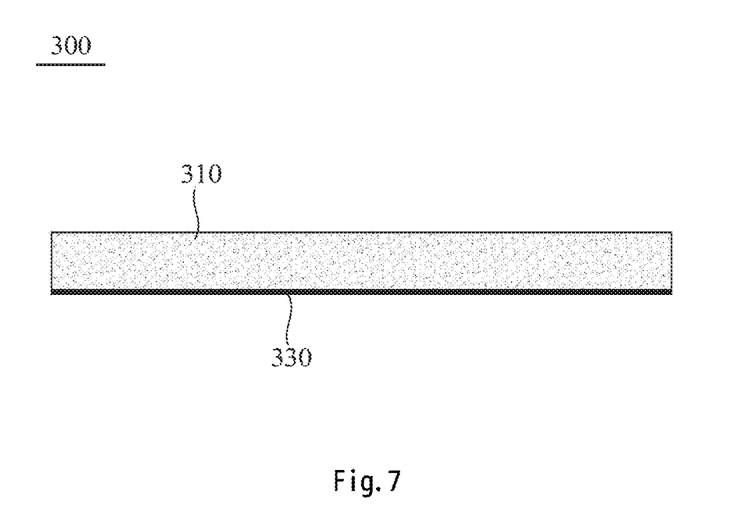
FIG. 7 is a structural schematic diagram of the floor board according to the second preferable embodiment of the present disclosure.
Figure 8:
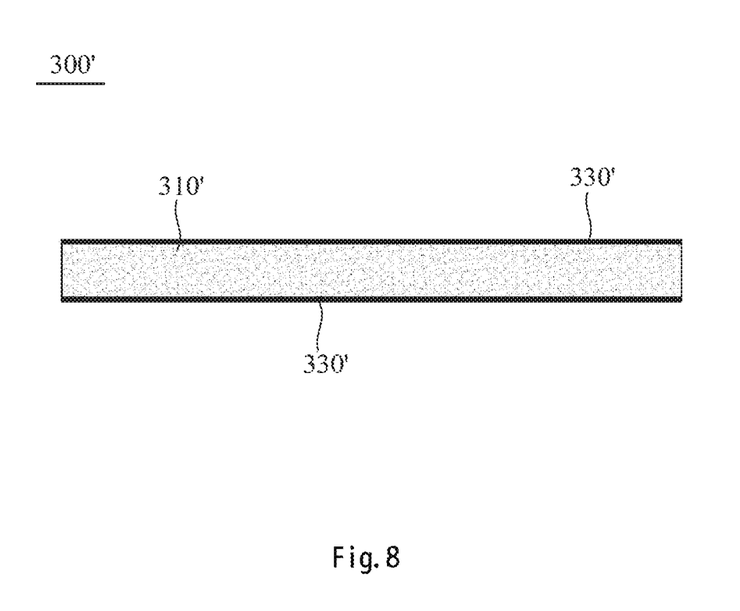
FIG. 8 is another structural schematic diagram of the floor board according to the second preferable embodiment of the present disclosure.

As shown in FIGS. 7 and 8, the structure of the floor board 300 according to the second preferable embodiment is substantially the same as that of the floor board 100 according to the first preferable embodiment, and differs in that the floor board 300 further comprises a FRP board 310 that is composited to the polyurethane-foam board 310. For the sake of brevity, the polyurethane-foam board 310 according to the present embodiment will not be described in detail.

The polyurethane-foam board 310 is the base-body member, and the FRP board 330 is a reinforcing member. The FRP board 330 can improve the load carrying performance of the floor board 300, increase the transverse strength of the floor board 300, and prevent the floor board 300 from cracking (particularly, prevent the cracking in the length direction of the floor board). As compared with the floor board 100 comprising merely the polyurethane-foam board, the transverse strength of the floor board 300 can be increased by above 5 times. Accordingly, the application fields of the floor board according to the present embodiment can be wider.

The FRP board 330 is located on at least one of the upper side and the lower side of the polyurethane-foam board 310. The position of the FRP board 330 relative to the polyurethane-foam board 310 may be set according to the requirements of usage and design. Preferably, FIG. 7 shows that the FRP board 330 is located under the polyurethane-foam board 310. Accordingly, the floor board 300 has a greatly improved mechanical property, and an optimum comprehensive cost performance.

If needed and/or desired, the quantity of the layers of the FRP boards 330 may be set according to the demands. The transverse strength of the floor board 300 increases with the increasing of the quantity of the layers of the FRP boards 330. For example, in a variant embodiment, as shown in FIG. 8, FRP boards 330' are provided on both of the upper side and the lower side of a polyurethane-foam board 310' of a floor board 300'. Accordingly, the mechanical property and the transverse strength of the floor board 300' can be further improved, to further prevent the floor board 300' from cracking.

The FRP board 330 is a flat panel manufactured from a fiber material and a resin material by pultrusion. The employed resin material is at least one of an unsaturated resin, a vinyl resin, an epoxy resin and a polyurethane resin. The employed fiber material is at least one of glass fiber, carbon fiber, aramid fiber, basalt fiber and other natural fiber materials.

Preferably, the thickness of the FRP board 330 is 0.5-5.0 mm, and is more preferably 1.2-5.0 mm, the density of the FRP board 330 is 1600-2100 $kg/m^3$, and the density of the polyurethane-foam board 310 is 500-700 $kg/m^3$. Under equal conditions, as compared with the floor board 100 according to the first embodiment, the load carrying performance of the floor board 300 composited with the FRP board can be improved by 20-40%. It can be understand that the load carrying performance of the floor board 300 is in direct proportion to the density of the floor board 300. The load carrying performance of the floor board 300 according to the present preferable embodiment can also meet the technical requirements of 7.26-ton car test and 10.886-ton 3000-times fatigue test. Furthermore, its overall cost is less than the overall cost of the high-density (700-1100 $kg/m^3$) floor board 100 according to the first preferable embodiment.

The polyurethane-foam board 310 and the FRP board 330 according to the present embodiment are adhered by using a glue adhesive. The process of manufacturing the floor board 300 is secondary processing.

Although the above embodiments comprise a polyurethane-foam board, if needed and/or desired, other suitable rigid-foam boards may be employed, replacing the polyurethane-foam board.

According to another aspect of the present embodiment, there is provided a method for manufacturing the floor board 300. The method comprises the steps of the method for manufacturing the floor board 100 according to the first embodiment, and further comprises a compositing step after the foaming-forming step.

Further, the compositing step comprises the following steps.

In a surface treating step, the adhesive face of the polyurethane-foam board 310 (the floor board 100 according to the first embodiment) is polished, and the adhesive face of the FRP board 330 is corona-treated. That enables the adhesive faces of them to have a certain surface roughness, which facilitates the application of the glue adhesive.

In an adhering step, the polyurethane-foam board 310 and the FRP board 330 are fixed by glue adhesion. Particularly, this step comprises applying a certain amount of glue adhesive on the adhesive faces of individually the polyurethane-foam board 310 and the FRP board 330, and adhering them together. In order to achieve a good adhering effect, the glue adhesive according to the present embodiment is a dual-component polyurethane glue or epoxy glue.

In a solidifying step, the glue adhesive used in the fixing by glue adhesion is solidified under a vacuum-negative-pressure condition. Particularly, this step comprises placing the adhered floor board 300 into a vacuum-negative-pressure machine, vacuumizing to provide the negative pressure, maintaining the pressure for 1-3 hours according to the solidifying time of the glue adhesive, and finally, when the glue adhesive has completed the solidification, taking out the floor board 300.

The inventors have performed test on the transverse strength of the floor board 300 manufactured by using the above method. The result of the test shows that the transverse strength is superior.

The Third Preferable Embodiment

Figure 9:
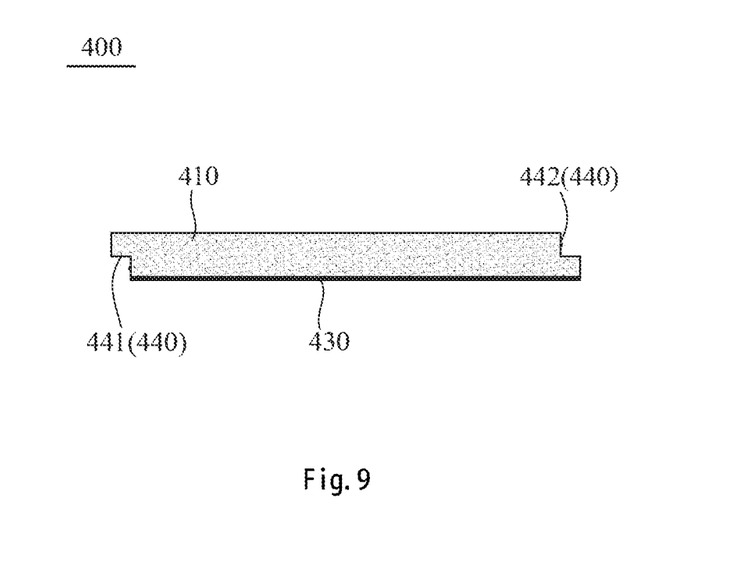
FIG. 9 is a structural schematic diagram of the floor board according to the third preferable embodiment of the present disclosure.
Figure 10:
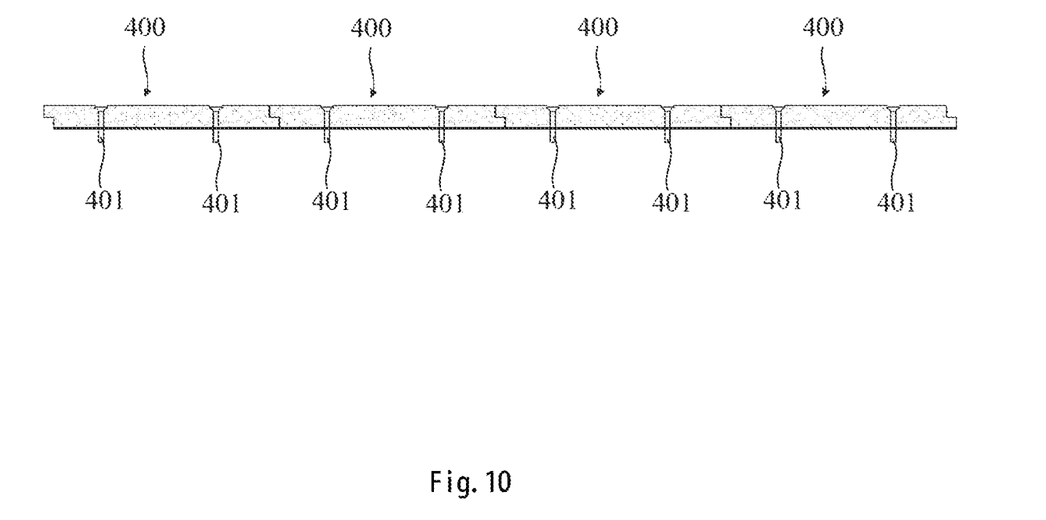
FIG. 10 is a schematic diagram of the connection state of a plurality of the floor boards shown in FIG. 9.

As shown in FIGS. 9 and 10, the structure of the floor board 400 according to the third preferable embodiment is substantially the same as that of the floor board 300 according to the second preferable embodiment, and differs in that the two ends of the floor board 400 are provided with rabbets 440 for splicing. Therefore, the functional elements that have substantially the same functions will be numbered similarly here, and, for the sake of brevity, the same parts will not be described too much.

Further, the rabbets 440 include a first rabbet 441 and a second rabbet 442 provided individually at the two ends of the floor board in the width direction. The directions of the openings of the first rabbet 441 and the second rabbet 442 are opposite. The shape of the first rabbet 441 and the shape of the second rabbet 442 match. The shape of the first rabbet 441 and the shape of the second rabbet 442 are preferably a step shape. Accordingly, the plurality of floor boards 400 can be connected to form a spliced floor board of an integral structure. As shown in FIG. 10, the plurality of floor boards 400 are spliced in the width direction of the floor boards, and are fixed to an underframe by using self tapping screws 401. The spliced floor board may serve as for example a container floor board or a vehicle floor board, which can satisfy the requirement on the leakproofness of the floor board in assembling and in use. It should be noted that the "underframe" refers to a component for fixing the floor board, such as a frame or a base. For example, the floor board of a container is fixed to the underframe of the container.

The thickness of the floor board for containers and vehicles according to the present embodiment has preferably three specifications 28 mm, 33.3 mm and 45 mm.

The floor board according to the present disclosure has the following advantageous effects:

1. The floor board utilizes fibers and polyurethane resin as the main raw materials, and eliminates using the timber from tropical rainforest, which is at the cost of damaging the environment. Furthermore, the floor board can realize more favorable replacement of traditional floor boards, and does not have any volatilization of poisonous and noxious gases.

2. The floor board is a floor board of a thermosetting material, and can resist the corrosion by salts, steam, water, fog, strong acids and strong bases and prevent moth damage, and the usage process does not generate maintenance and repair cost, which reduces the operation cost for the user.

3. The usage habit is satisfied. The synthesized floor board has the equivalent nail holding property and property of nail-fixing of goods to timber, which satisfies the traditional usage habit of floor boards of containers and vehicles.

4. The service life is long. When the synthesized floor board according to the present disclosure is applied as the floor board of containers and vehicles, its service life is expected to be 15 years, which, as compared with the service lives of 5-8 years of traditional wood floor boards, has a great edge in the life, and moreover reduces the adding of the operation cost imposed on the user due to floor board replacement.

The floor board according to the present disclosure has the advantages such as an excellent overall performance, a small weight, a high strength, a good corrosion resistance, a good anti-fatigue property and a long service life. Furthermore, the floor board has the same textures and densities as those of wood floor boards, has a wide applicability, an economical advantage and an environment-friendly nature, and is an ideal alternative for traditional floor boards. Furthermore, the floor board can satisfy the usage requirement that the floor board is to be nailed during a cargo transportation process to fix the cargo.

Unless defined otherwise, the technical and scientific terms used herein have the same meanings as those generally understood by a person skilled in the art of the present disclosure. The terms used herein are merely for the purpose of describing the particular implementation, and are not intended to limit the present disclosure. The terms such as "component" used herein may indicate a single part, and may also indicate the combination of multiple parts. The terms such as "install" and "provide" used herein may indicate one component directly attaching to another component, and may also indicate one component attaching to another component via an intermediate component. An element that is described in one embodiment herein may be applied to another embodiment solely or in a combination with another element, unless the element is not applicable in the another embodiment or indicated otherwise.

The present disclosure has been described by using the above embodiments. However, it should be understood that the above embodiments are merely for the purpose of illustration and description, and are not intended to limit the present disclosure within the scope of the described embodiments. Moreover, a person skilled in the art can understand that the present disclosure is not limited to the above embodiments, more variations and modifications can be made according to the teaching of the present disclosure, and all of the variations and modifications fall within the scope claimed by the present disclosure. The protection scope of the present disclosure is defined by the scope of the appended claims and equivalents thereof.

What is claimed is:

1. A floor board comprising a polyurethane-foam board where the polyurethane-foam board is made from a polyurethane foamed material that is made by foaming a polyurethane foaming raw material;
    wherein the polyurethane-foam board is provided with a plurality of thread-like members that extend throughout the polyurethane-foam board in a predetermined direction, and the plurality of thread-like members are arranged with spacings therebetween; and
    the polyurethane-foam board is foaming-formed by continuous pulling;
    wherein the floor board further comprises an FRP board, and the FRP board is located on at least one of an upper side and a lower side of the polyurethane-foam board; and
    wherein a density of the FRP board is 1600-2100 kg/m$^3$.

2. The floor board according to claim 1, wherein a thickness of the FRP board is 0.5-5.0.

3. The floor board according to claim 1, wherein the plurality of thread-like members are arranged with equal spacings therebetween.

4. The floor board according to claim 3, wherein the thread-like members extend in a length direction of the floor board, and the plurality of thread-like members are arranged with equal spacings therebetween in a width direction of the floor board.

5. The floor board according to claim 1, wherein the polyurethane foaming raw material comprises a polyurethane resin and a foaming agent.

6. The floor board according to claim 1, wherein the thread-like members are made from at least one of glass fiber, carbon fiber, aramid fiber and basalt fiber.

7. The floor board according to claim 1, wherein a thickness of the polyurethane-foam board is 20-100 mm.

8. The floor board according to claim 7, wherein the thickness of the polyurethane-foam board is 25-35 mm.

9. The floor board according to claim 1, wherein two ends of the floor board are provided with rabbets for splicing.

* * * * *